# (12) United States Patent
Extra

(10) Patent No.: US 8,245,215 B2
(45) Date of Patent: Aug. 14, 2012

(54) METHOD FOR AUTOMATICALLY MODIFYING A PROGRAM AND AUTOMATION SYSTEM

(75) Inventor: Johannes Extra, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 962 days.

(21) Appl. No.: 12/287,483

(22) Filed: Oct. 9, 2008

(65) Prior Publication Data

US 2009/0100159 A1    Apr. 16, 2009

(30) Foreign Application Priority Data

Oct. 16, 2007  (EP) ..................................... 07020255

(51) Int. Cl.
*G06F 9/44* (2006.01)

(52) U.S. Cl. ........ 717/168; 717/103; 717/169; 717/170; 717/171; 709/201

(58) Field of Classification Search .................. 717/169, 717/171
See application file for complete search history.

(56) References Cited

U.S. PATENT DOCUMENTS

| | | | | |
|---|---|---|---|---|
| 5,485,601 | A * | 1/1996 | Ching | 717/106 |
| 5,956,513 | A * | 9/1999 | McLain, Jr. | 717/142 |
| 6,493,871 | B1 * | 12/2002 | McGuire et al. | 717/173 |
| 6,601,233 | B1 * | 7/2003 | Underwood | 717/102 |
| 6,930,785 | B1 | 8/2005 | Weyand et al. | |
| 7,631,299 | B2 * | 12/2009 | Kannenberg | 717/121 |
| 7,661,025 | B2 * | 2/2010 | Banks et al. | 714/12 |
| 7,818,736 | B2 * | 10/2010 | Appavoo et al. | 717/168 |
| 2002/0067504 | A1 | 6/2002 | Salgado et al. | |
| 2003/0041127 | A1 | 2/2003 | Turnbull | |
| 2004/0015952 | A1 | 1/2004 | Lajoie et al. | |
| 2004/0199615 | A1 * | 10/2004 | Philyaw | 709/220 |
| 2004/0237068 | A1 * | 11/2004 | Ren | 717/110 |
| 2005/0144614 | A1 * | 6/2005 | Moslander et al. | 717/168 |
| 2006/0095903 | A1 * | 5/2006 | Cheam et al. | 717/168 |
| 2006/0120316 | A1 | 6/2006 | Von Stein et al. | |

(Continued)

FOREIGN PATENT DOCUMENTS

DE    10234304 A1    2/2004

(Continued)

OTHER PUBLICATIONS

Title: Model-based performance prediction in software development: a survey, author: mo, S et al, dated: May 2004, source: IEEE.*

(Continued)

*Primary Examiner* — Chameli Das

(57) ABSTRACT

A method for automatically modifying a program of an automation system, wherein a first item of data related to a program component is determined using an identificator assigned to the automation system, wherein a program code object stored in a database is selected using a selector based upon the first item of data, and wherein the program is modified by means of the program code object in that the program code object is integrated into the program. Further, an automation system with a program having program components and which is automatically modifiable in accordance with the method, having an assigned identificator for determining a first item of data related to a program component, a selector for selecting a program code object stored in a database based upon the first item of data, and an integrator for integrating the program code object into the program and finally a computer readable medium.

18 Claims, 3 Drawing Sheets

U.S. PATENT DOCUMENTS

| | | | |
|---|---|---|---|
| 2007/0016900 A1* | 1/2007 | Brandt et al. | 717/168 |
| 2007/0094655 A1* | 4/2007 | Rostampour | 717/168 |
| 2007/0157191 A1* | 7/2007 | Seeger et al. | 717/168 |
| 2010/0180271 A1* | 7/2010 | Arsenault et al. | 717/168 |
| 2011/0023014 A1* | 1/2011 | Harper et al. | 717/108 |

FOREIGN PATENT DOCUMENTS

| | | |
|---|---|---|
| DE | 102006005365 A1 | 8/2007 |
| WO | 0017749 A1 | 3/2000 |
| WO | 2006063616 A1 | 6/2006 |

OTHER PUBLICATIONS

Title: Transforming structural model to runtime model of embedded software with real-time constraints, Kodase, S, dated:2003, source: IEEE.*

* cited by examiner

METHOD FOR AUTOMATICALLY MODIFYING A PROGRAM AND AUTOMATION SYSTEM

CROSS REFERENCE TO RELATED APPLICATIONS

This application claims priority of European Patent Office application No. 07020255.1 EP filed Oct. 16, 2007, which is incorporated by reference herein in its entirety.

FIELD OF INVENTION

The invention relates to a method for automatically modifying a program of an automation system. It also relates to an automation system having an automatically modifiable program as well as to a computer program containing program code instructions for implementing a method for automatically modifying the program of the automation system and a computer program product containing a computer program of said type.

BACKGROUND OF INVENTION

Methods for modifying firmware and/or software of automation systems are generally known. The term "automation system" includes in this context all devices or equipment, that is to say in addition to e.g. controllers, such as programmable logic controllers, process control computers, (industrial) computers and the like, also drive controllers, frequency converters and the like, as are used or suitable to be used for controlling, regulating and/or monitoring technological processes e.g. for converting or transporting material, energy or information etc., with energy being applied or converted in particular via suitable technical devices, such as e.g. sensors or actuators.

When a modification of the aforesaid kind, in other words e.g. an update or upgrade, is initiated, a user of the automation system generally becomes active. In this case the user makes use of a hardware or software "tool" by means of which he/she transfers a piece of firmware and/or a program of the automation system into the automation system, in particular the firmware and/or software. In addition an activation, again initiated by the user, between the previous and the updated software/firmware, which is to say e.g. an installation, is necessary.

In an automated alternative to a modification of said kind, an application residing on a server disposed at a remote location from the automation system establishes a communication connection to the automation system. The application checks the firmware and/or software of the automation system and if necessary transfers a more up-to-date firmware and/or software version into the automation system. Said firmware and/or software are/is activated on the automation system following the transfer by the application.

A disadvantageous aspect with this generally known method, however, is that an activity "from outside" is necessary for completing the modification, in other words, for example, a user must become active or an application must be launched on the remotely disposed server. With this approach, therefore, the automation system and/or its firmware and/or software are dependent on a user or on a specific server.

SUMMARY OF INVENTION

One object of the invention is therefore to disclose an improved method for automatically modifying a program of an automation system, e.g. a program comprising firmware components, in particular a control program and the like, in which method the automation system is independent of an application on a server and/or of a user action. A further object is to enable the program of the automation system to be modified during its runtime.

This object is achieved by means of a method for automatically modifying a program of the automation system, as defined in one of the independent claims. Toward that end it is provided that a first item of data relating to a program component which is or can be stored e.g. in a nonvolatile memory, e.g. in an EPROM, EEPROM, buffered RAM, on a memory card, hard disk and the like, is determined with the aid of an identification means assigned to the automation system. With the aid of a selection means, for example a software and/or hardware selection means, such as e.g. a selection program, a selection routine, a subroutine or the like, a data object which is or can be stored in at least one database, in particular a data object containing program code data—hereinafter referred to as a program code object—, is selected on the basis of the first item of data and the program of the automation system is at least partially modified by means of the program code object in that the program code object is integrated into the program. By this means it is ensured that the modification is initiated and implemented automatically by the automation system itself. The identification means can be realized as software for example.

A further object is to disclose an automation system that is particularly suitable for implementing the method. This object is achieved by means of an automation system as defined in one of the independent claims.

Advantageous embodiments are the subject matter of the dependent claims. Back-references used therein point to the further embodiment of the subject matter of the main claim by means of the features of the respective dependent claim; they are not to be understood as a renunciation of the achievement of an independent protection of the subject matter for the feature combinations of the related dependent claims. Furthermore, with regard to an interpretation of the claims in a more detailed concretization of a feature in a subordinate claim it is to be assumed that a restriction of said type is not present in the respective preceding claims.

The program preferably comprises at least firmware components, wherein a first item of data relating to a firmware component as a program component is determined with the aid of an identification means assigned to the automation system and wherein the program is at least partially modified by means of the program code object by the program code object's being integrated into the program as a firmware component. In this way a simple modification and/or updating of the program, in particular by means of the firmware component, are/is ensured.

In a preferred embodiment the database is assigned to at least one server, wherein the server can be disposed remotely from the automation system or can be an integral part of the automation system or another automation system.

With a server disposed remotely from the automation system it is easier for example to store program code objects. Furthermore the database can be extended, added to, enlarged, relocated and the like in a straightforward manner; constructing the database in modular fashion from interchangeable sub-databases is also possible. In this case the database can be an integral part of the server or it can be communicatively connected to the latter on a hardwired or wireless basis, hardwired referring in this instance and in the following e.g. to a cable, conductor and/or the like and wireless e.g. to a radio link, a W-LAN (Wireless LAN), Bluetooth, infrared, laser, wireless FireWire and the like. In this scheme the server and the automation system can likewise be communicatively connected or connectable to each other on a hardwired or wireless basis. Moreover, server and automation system can be connected for example directly or indirectly, e.g. by means of the internet. Furthermore, a plurality of automation systems can access a server and in this way for example form a network in a star configuration, or a ring configuration, a line configuration or a combination of star, ring and/or line configuration can be provided, thereby simplifying maintenance and/or updating or the like and thus contributing toward a reduction in costs.

Particularly preferably the selection means, the identification means or the selection and the identification means are embodied as program components, in other words as constituent parts of the automation system program that is possibly to be updated. This ensures a high degree of flexibility e.g. based on easy changeability, e.g. update and/or upgrade capability. Alternatively at least one of said means can be embodied as at least one external component, i.e. a component not assigned to the program, which has access to the program or at least to components of the program. In addition or alternatively, selection means and/or identification means can be implemented as hardware.

Preferably at least one second item of data relating to the program component, in other words e.g. the firmware component, and at least one third item of data relating to the selected program code object are compared, for example by means of a comparator, and the program is at least partially modified based on a result of the comparison. In this case the second and third item of data can be e.g. a version number, a creation date, a change date, a reference number, a combination of these and/or the like. In this way it is made certain that the selected program code object will ensure an update, an improvement, an extension, a change or some other desired modification of the program. Accordingly it can be ensured that a program component, in particular a firmware component, as which the program code object is integrated into the program, is more up-to-date than a corresponding program component already present in the automation system, in other words that e.g. an update/upgrade or downgrade is implemented.

Particularly preferably the second item of data can be extracted or determined from the program. In addition the third item of data can be extractable or determinable from the program code object. The second, third, or both items of data can be a version number, a creation date, a change date, a reference number, a program name, a batch size, a batch identification or the like or a combination thereof. Extractable means in this instance and in the following that for example at least one item of data can be used directly from the program (second item of data) or the program code object (third item of data) or e.g. can be determined from the program or from at least a part of the program on the basis of an algorithm or the like. In addition or alternatively, at least one item of data can be stored or can be storable externally, i.e. not in the program, and be used directly as a second or third item of data or indirectly as an input value for the algorithm. This ensures a good degree of changeability of the second and/or third item of data, thereby resulting in an improved adaptability of the method to a further development of the automation system or the automation technology.

In addition or alternatively, the first item of data can be a version number, a creation date, a change date, a reference number, a program name, a batch identification (e.g. a batch name or the like), a batch size, a hardware identification, such as for example a board ID (identification), a processor ID and/or a MAC (Media Access Control) address, and/or the like, and furthermore the first item of data can correspond to the second item of data, i.e. the second item of data can, for example, be determinable from the first item of data or be identical to the latter.

Preferably the method is invoked and/or carried out with the aid of an initialization means, which can be implemented e.g. as a software and/or hardware component, in connection with an initialization of the program, a program termination, a program interruption, a program pause or the like. An initialization of the program refers in this context for example to an activation of the program, e.g. during a "startup" of the automation system or the like. In the process the initialization means can additionally check whether the automatic modification method can be carried out, i.e. whether the program code object can be integrated into the program. Alternatively a check of said kind can be initiated and/or controlled by the initialization means. In this way it is ensured that for example during a runtime of the program only such program components, in particular firmware components, are changed whose replacement does not disrupt, impede, interrupt or otherwise adversely affect the automation process controlled by the program. An activation of updated program components, in particular firmware components, as a result of their integration into the program can be decoupled in time from the installation, i.e. the transfer. In this case the program code object can be held in reserve in a database until the check carried out with the aid of the initialization means has confirmed that the activation can be carried out without compromising the operation of the automation system.

The program can exclusively comprise firmware components which are stored or can be stored in a nonvolatile memory, in other words e.g. in an EPROM, EEPROM, buffered RAM, on a memory card, hard disk or the like. This ensures a simple, convenient and economical capability to change, e.g. update or upgrade, the program, in particular the firmware and/or firmware components.

With regard to the automation system it is preferably provided that the automation system and the server include at least one generally known interface for the purpose of communicatively connecting the automation system to the server.

At least one program code object can be stored or can be storable in the database for the or each first item of data, so that on the basis of the first item of data one or more than one stored program code object is or are selected and transferred into the automation system, where it/they is/are then activated at a time close to or decoupled from the time of transfer.

In this case one or more additional program code objects which, for example, are necessary or desirable for a correct executability of the program code object after its integration into the program or for an executability of the program as a whole, or which comprise additional functions for the program code object that is to be integrated can be assigned to the or each program code object in the first database, e.g. in a reference table. It is achieved in this way for example that in the case of an integration of program code objects which require additional functionality, these are simultaneously acquired as well by the integration process.

The selection means and/or identification means can be stored or can be storable e.g. in a second database which is assigned to the automation system or is an integral part of the automation system. In this way a simple changeability or interchangeability of selection means and/or identification means is ensured by a replacing of the second database by another second database.

The second item of data and the third item of data can be compared for example by a comparison means implemented in hardware or software. Said means can generate a signal which activates the modification of the program based on the result of the comparison. In this case the modification can also be decoupled in time from the activation. For example, the first item of data and/or the second item of data can be extracted and/or determined from the program and/or the third item of data can be extracted and/or determined from the program code object by means of at least one first determination component of the program, in other words e.g. a subroutine of the program, from the program itself or from data stored for the program.

The advantage of the embodiments therefore consists in particular in the fact that an activity in relation to the automatic modification, e.g. an initiation and/or execution of the automatic modification, of a program that is to be updated in an automation system (in particular of the program comprising at least one firmware component) originates from the automation system or the program itself. This means in particular that no activity "from outside", in other words e.g. on the part of a user and/or an external server having a piece of application software, is necessary. In this case the application software of the server would be required for setting up a connection to the automation system, proceeding from the server. It would effect a check on the up-to-dateness of the firmware component, the program and the like and for example transfer a more recent firmware component or a more recent program into the automation device. In addition the application software of the server would activate the transferred firmware or the transferred program in the automation system.

A further advantage is that, for example, different types of production are possible based on one machine having one or more automation systems. Program code objects which comprise e.g. data necessary for production are in this case stored for example automatically or by the user on the server (and/or in the database assigned to the server) in connection with a time at which said production is to take place. The automation system "searches" continuously or at time intervals for "suitable" program code objects and loads these automatically from the server or from the database. In addition said program code objects can then be activated automatically.

In this case at least one data object stored in the database can represent an item of data relating to a production process or a related data record or in its embodiment as a program code object can comprise such data. The item of data or data record describes therein a batch size, a batch identification, an identification of a program that is to be processed, a tool identification, temperature, speed and the like. Thus, production-process-relevant data for an automation system or a group of automation systems can be stored in a simple and cost-effective manner at a "central point", where it is kept available to the automation system(s) for "retrieval". Since the automation system checks continuously or at time intervals whether data or data records are stored for it, the data to be used in a particular case is quickly available to the automation system, thereby necessitating a high degree of flexibility on the part of a production controller and rapid adaptability to changed production conditions, starting materials, products, quantities to be produced, tools, production processes and the like. Thus it can happen, for example, that a production step is performed by means of the automation system at a temperature T1. If, however, it transpires that its efficiency can be increased by its being performed at a changed temperature T2, a data or program code object including said temperature (T2) can be easily and quickly stored in the database assigned to the server. Said object is "found" there by the automation system on the basis of a check performed by the automation system on the data/data records stored in the database, downloaded and integrated into the program, with the result that the production step is now performed at the changed temperature T2.

Furthermore, simple installation of a different version, e.g. of a piece of firmware/of firmware components, project(s), program(s) and the like is also made possible. In addition, at least one maintenance configuration can be installed and activated for example between two production configurations.

Because the automation device comprises the program which sets up a communication connection to the server associated with the first database or initiates or controls the setup, it is not necessary e.g. to activate an electronic protection measure, such as e.g. a firewall which protects the automation device against unauthorized access. Moreover, e.g. an authentication and/or authorization of users accessing "from outside", application software in the server, a software or hardware "tool" is not necessary, as a result of which, inter alia, an increase in the ease of use of the automation system is achieved.

Since in addition a simple expansion of the first database, e.g. by further storage components, is easily and inexpensively possible, a large number of program code objects can be held in reserve at a central point, thereby producing a further simplification and a reduction in costs.

An exemplary embodiment is explained in more detail below with reference to the drawing. Objects or elements corresponding to one another are identified by the same reference signs in all the figures.

The or each exemplary embodiment is not to be understood as a restriction of the invention. Rather, numerous variations and modifications are possible within the scope of the present disclosure, in particular such variants and combinations which for example by combination or modification of individual features or elements or method steps described in the general or specific part of the description as well as contained in the claims and/or the drawing are derivable for the person skilled in the art with regard to the achievement of the object and by means of combinable features lead to a new subject matter or to new method steps or method step sequences.

BRIEF DESCRIPTION OF THE DRAWINGS

Brief description of the drawings

Figure 1:
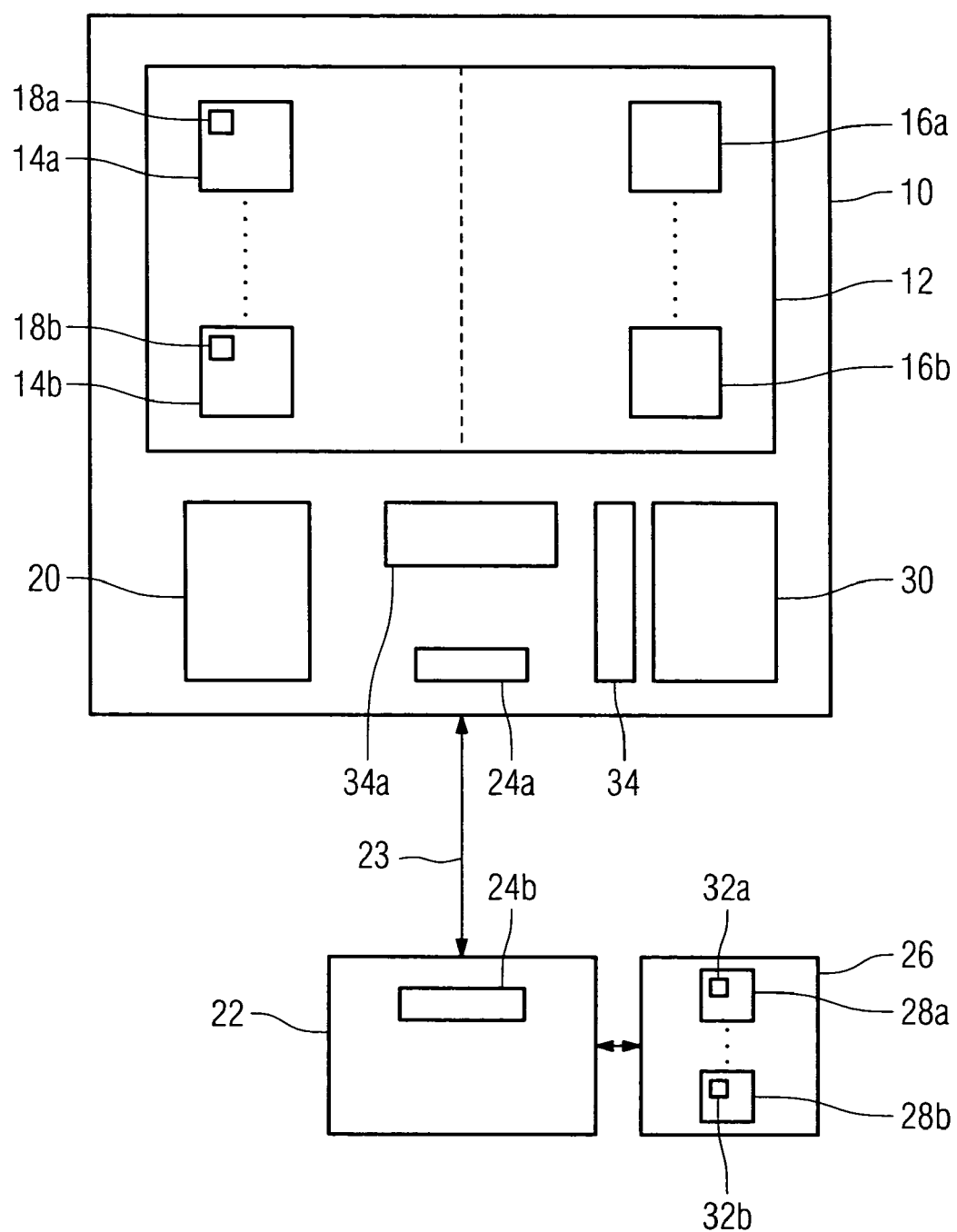
Figure 2:
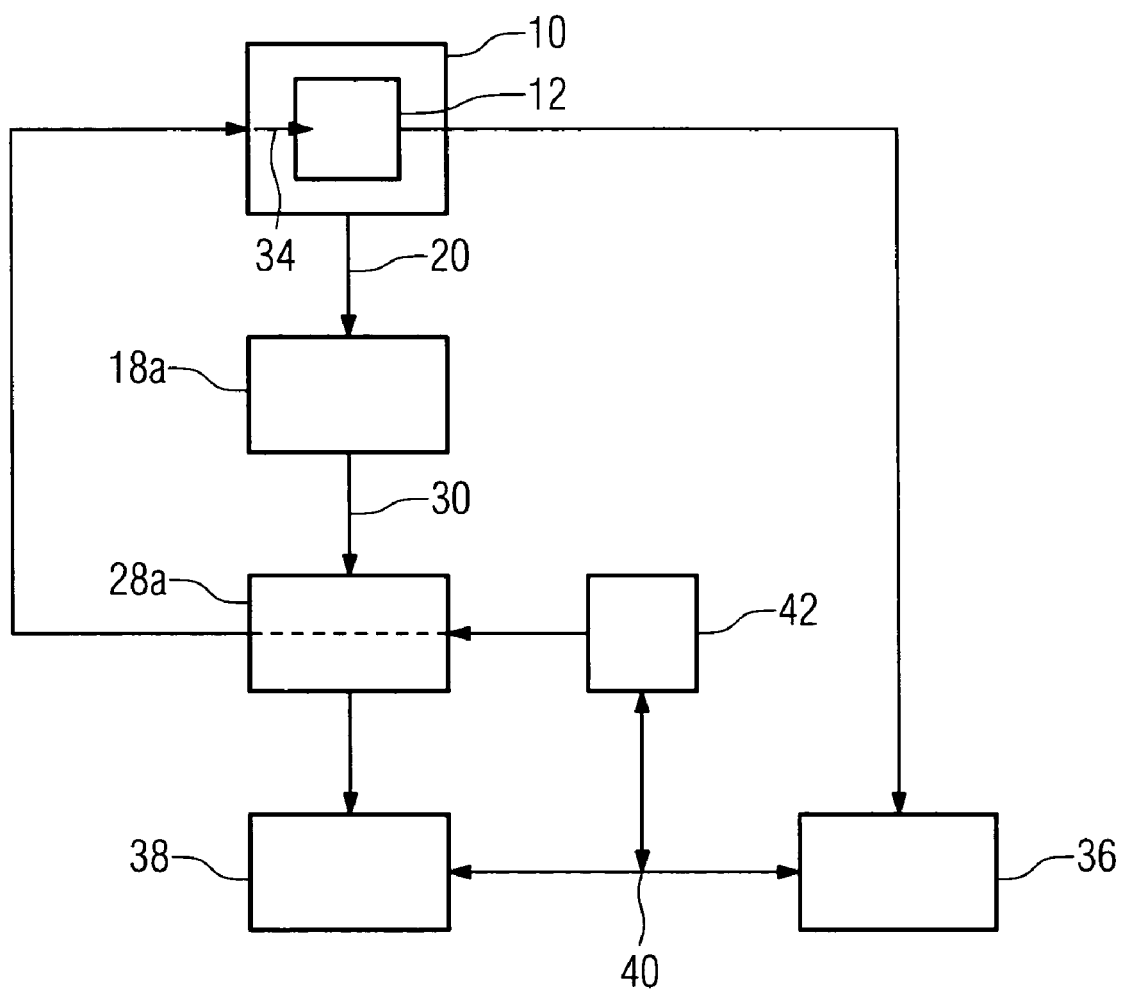
Figure 3:
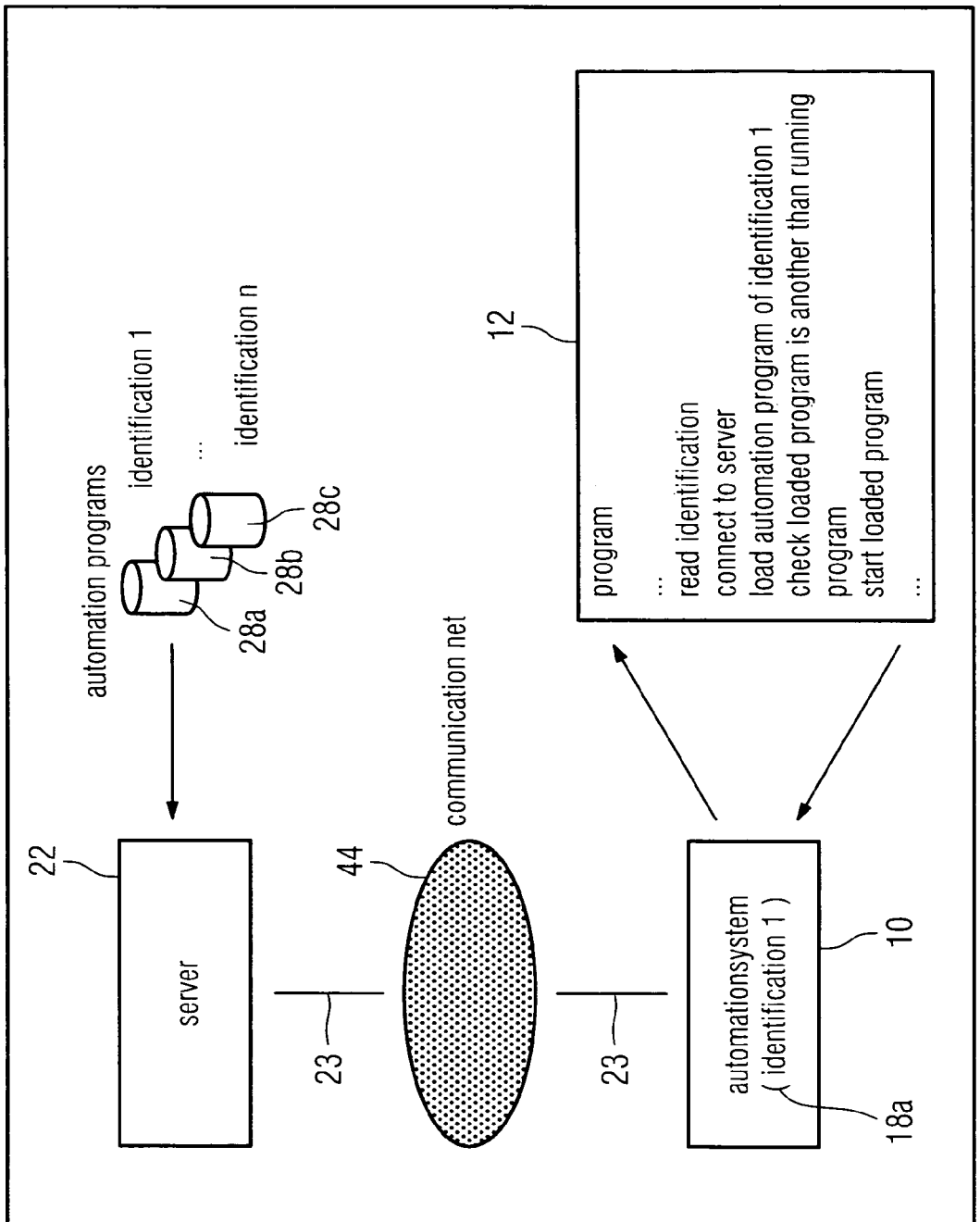

FIG. 1 is a schematic representation of an automation system having an automatically modifiable program, FIG. 2 is a schematic representation of a method for automatically modifying a program of an automation system, and FIG. 3 is a schematic representation of a communications network together with the method as illustrated in FIG. 2, with selection, transfer and activation of a program code object.

DETAILED DESCRIPTION OF INVENTION

FIG. 1 schematically shows an automation system 10 having an automatically modifiable program 12, the program 12 comprising at least one firmware component 14*a*. If necessary, however, further firmware components 14*b* and/or at least one program component 16*a* can be included. A first item of data 18*a*, 18*b* is in this case related to the firmware component 14*a*, 14*b* and/or can e.g. be stored for the firmware component 14*a*, 14*b* in a database (not shown). An identification means 20 assigned to the automation system 10 determines a first item of data 18*a*, 18*b* associated with the firmware component 14*a*, 14*b*. The automation system 10 and a server 22 disposed remotely therefrom communicate in this case on a hardwired or wireless basis via a communication connection 23, e.g. using interfaces 24*a*, 24*b* that are known per se. In this scheme a database 26 in which program code objects 28*a*, 28*b*, are stored is accessed via the server 22. This access is effected by a selection means 30 which is assigned to the automation system 10 and can be implemented as hardware or software or a combination thereof. A program code object 28a, 28b, 28c is selected by the selection means 30 on the basis of the first item of data 18a, 18b determined with the aid of the identification means 20. An item of data—fourth item of data 32a, 32b—matching the first item of data 18a, 18b or corresponding to said first item of data 18a, 18b can be determined or is stored for each program code object 28a, 28b, 28c. The program code object 28a, 28b, 28c selected with the aid of the selection means 30 is transferred into the automation system 10. An integration means 34 of the automation system 10 integrates the selected program code object 28a, 28b, 28c into the program 12, the selected program code object 28a, 28b, 28c being integrated into the program 12 in particular as a firmware component 14a, 14b. Other program code objects 28a, 28b, 28c can also be integrated into the program 12 as a program component 16a, 16b. The integration of the program code object 28a, 28b, 28c into the program 12 serves in this case to modify the program 12 and can take place for example during the transfer of the program code object 28a, 28b, 28c into the automation system 10 or following the transfer. If the integration takes place after the transfer into the automation system 10, it can be performed for example in connection with an initialization, a termination, an interruption, a pause, an execution of the program 12 or the like. In the process the integration means 34 checks whether the automatic modification can be implemented without adversely affecting a program run. Alternatively the integration means 34 can be controlled, in other words e.g. e.g. triggered, interrupted, terminated and the like, by means of the program 12 or the automation system 10 or by means of a signal (not shown) which is generated by an initialization means 34a associated with the program 12 or the automation system.

Identification means 20, selection means 30 and/or integration means 34 can be implemented as software and/or as hardware and e.g. be an integral part of the automation system 10, in this case for example parts assigned in particular to the program 12, such as e.g. subroutines, program components and the like.

FIG. 2 shows a schematic representation of the method for automatically modifying the program 12. In this case the first item of data 18a relating to the firmware component 14a, 14b and/or stored for the latter is initially determined by the identification means 20. A program code object 28a stored in the database 26 (see FIG. 1) is selected with the aid of the selection means 30 on the basis of said first item of data 18a. A second item of data 36 determined from the program 12 and/or stored for said program 12 is compared, e.g. by means of a comparator 40 which can be implemented as software and/or hardware, with a third item of data 38 determined from the program code object 28a and/or stored for the latter. Here, the second item of data 36 can be for example identical to the first item of data 18a or can be determined from the latter, e.g. by means of an algorithm. If the result of the comparison is that a selection criterion 42 for the program code object 28a has been met, in other words e.g. the program code object 28a is more up-to-date than the firmware component 14a, 14b (shown in FIG. 1), the program code object 28a is integrated into the program 12. Toward that end the program code object 28a is first transferred into the automation system 10. Together with the transfer to the automation system 10, the program 12 is modified, for example with the aid of the integration means 34 (as shown in FIG. 1).

FIG. 3 shows a schematic representation of a communications network 44 together with the method as illustrated in FIG. 2. The first item of data 18a is determined in the automation system 10. The automation system 10 establishes a communication connection 23 to the server 22. With the aid of the selection means 30 (shown in FIG. 1) a program code object 28b is then selected from a number of program code objects 28a, 28b, 28c and transferred via the server 22 and the communication connection 23, in this case the communications network 44, into the automation system 10. During the selection or in connection with the transfer of the program code object 28b a check is carried out to determine whether the program code object 28b is more up-to-date than the program component 16a, 16b. Following the check, if the check has verified that the program code object 28b is more recent, the latter is integrated into the program 12 and the program 12 modified accordingly. In this case the program code object 28b is integrated in particular as a firmware component 14a, 14b (shown in FIG. 1). The program 12 can be modified during, before or after a runtime. With the aid of the initialization means 34a it can be ensured here that the program 12, parts of the program 12 or an execution thereof is/are not adversely affected at a time when the program code object 28a, 28b, 28c is integrated into the program 12, so that for example an automation process executed by the automation system 10 or by parts of the automation system 10 is not disrupted and/or aborted.

Thus, it can be briefly summarized as follows: A method for automatically modifying a program 12 of an automation system 10 is disclosed, wherein a first item of data 18a, 18b relating to a program component 16a, 16b of the program 12 is determined with the aid of an identification means 20 assigned to the automation system 10, wherein a program code object 28a, 28b, 28c which is stored or can be stored in at least one database 26 is selected with the aid of a selection means 30 on the basis of the first item of data 18a, 18b, and wherein the program 12 is at least partially modified by means of the program code object 28a, 28b, 28c in that the program code object 28a, 28b, 28c is integrated into the program 12; also disclosed is an automation system 10 having a program 12 comprising in particular at least firmware components 14a, 14b and automatically modifiable in accordance with the method, having an assigned identification means 20 for determining a first item of data 18a, 18b relating to a program component 16a, 16b, in particular a firmware component 14a, 14b, having a selection means 30 for selecting, on the basis of the first item of data 18a, 18b, a program code object 28a, 28b, 28c which is stored or can be stored in at least one database 26, and an integration means 34 for integrating the program code object 28a, 28b, 28c, in particular as a firmware component 14a, 14b, into the program 12, and finally a computer program containing computer-executable program code instructions for implementing a method of said kind and a computer program product, in particular a storage medium, containing such a computer program.

The invention claimed is:

1. A computer-executable method for automatically modifying a program stored in memory of an automation system, the computer-executable method comprising:
   determining a first item of data related to a program component of the program using an identificator assigned to the automation system;
   initiating by the automation system a connection with a remote database;
   selecting a program code object which is stored in the remote database using a selector based upon the first item of data;
   determining a second item of data related to the program component of the program;
   determining a third item of data related to the selected program code object;
   comparing the second item of data to the third item of data to determine whether the program code object is updated compared to the program component;
   checking whether a modification of the program can be implemented without affecting a running program; and modifying the program with the program code object based upon results from the comparing and the checking steps, wherein the program code object is integrated into the program only if the program code object is updated compared to the program component and modification of the program can be implemented without affecting a running program.

2. The method as claimed in claim 1, further comprising:
providing firmware components, wherein the firmware components are part of the program;
determining a first item of data related to a firmware component as a program component using the identificator assigned to the automation system; and
modifying the program with the program code object, wherein the program code object is integrated into the program as a firmware component.

3. The method as claimed in claim 2, wherein the remote database is assigned to a server disposed remotely from the automation system.

4. The method as claimed in claim 2, wherein the selector and the identificator are program components of the program.

5. The method as claimed in claim 2, wherein the second item of data is determined from the program, and wherein the third item of data is determined from the program code object.

6. The method as claimed in claim 2, wherein the second or the third item of data are selected from the group consisting of a version number, a creation date, a change date, a reference number and a combination thereof.

7. The method as claimed in claim 2, wherein the first item of data is selected from the group consisting of a version number, a creation date, a change date, a reference number, a hardware identification and a combination thereof.

8. The method as claimed in claim 1, wherein the remote database is assigned to a server disposed remotely from the automation system.

9. The method as claimed in claim 1, wherein the selector or the identificator are program components of the program.

10. The method as claimed in claim 1, wherein the second item of data is determined from the program, and wherein the third item of data is determined from the program code object.

11. The method as claimed in claim 1, wherein the second or the third item of data are selected from the group consisting of a version number, a creation date, a change date, a reference number and a combination thereof.

12. The method as claimed in claim 1, wherein the first item of data is selected from the group consisting of a version number, a creation date, a change date, a reference number, a hardware identification and a combination thereof.

13. The method as claimed in claim 1, further comprising:
invoking an automatic modification using an initialization in connection with an initialization of the program, a program termination, a program interruption and/or a program pause; and
checking by the initialization whether the automatic modification is performable.

14. The method as claimed in claim 1, wherein the program exclusively comprises firmware components which are stored in a nonvolatile memory.

15. An automation system having stored in memory therein an automatically modifiable program comprising computer-executable program code instructions to be executed by the automation system, comprising:
an identificator assigned to the automation system for determining a first item of data related to a program component;
an communication interface for initiating by the automation system a connection between the automation system and a remote database;
a selector to select a program code object which is stored in the remote database based upon the first item of data;
a comparator for comparing a second item of data related to the program component of the program with a third item of data related to the selected program code object to determine whether the program code object is updated compared to the program component;
an initializer for checking whether a modification of the program can be implemented without affecting a running program; and
an integrator for integrating the program code object into the program based upon results from the comparator and initializer for the purpose of modifying the program, wherein the program code object is integrated into the program only if the program code object is updated compared to the program component and modification of the program can be implemented without affecting a running program.

16. The automation system as claimed in claim 15, wherein the automation system comprises firmware components, and wherein the program component is a firmware component and the program code object is integrated into the program as a firmware component.

17. A non-transitory computer readable medium encoded with a computer program to be executed on a computer to provide a method for automatically modifying a program of an automation system comprising computer-executable program code instructions for:
determining a first item of data related to a program component of the program using an identificator assigned to the automation system;
initiating by the automation system a connection with a remote database;
selecting a program code object which is stored in the remote database using a selector based upon the first item of data;
determining a second item of data related to the program component of the program;
determining a third item of data related to the selected program code object;
comparing the second item of data to the third item of data to determine whether the program code object is updated compared to the program component;
checking whether a modification of the program can be implemented without affecting a running program; and
modifying the program with the program code object based upon results from the comparing and the checking steps, wherein the program code object is integrated into the program only if the program code object is updated compared to the program component and modification of the program can be implemented without affecting a running program.

18. The non-transitory computer readable medium as claimed in claim 17, wherein:
the second item of data related to the program component of the program and the third item of data related to the selected program code object are selected from the group consisting of a version number, a creation date, a change date, a reference number and a combination thereof.

* * * * *